Dec. 13, 1927.     1,652,560
J. S. CULP
TIRE CARRIER
Filed Aug. 15, 1925    2 Sheets-Sheet 2
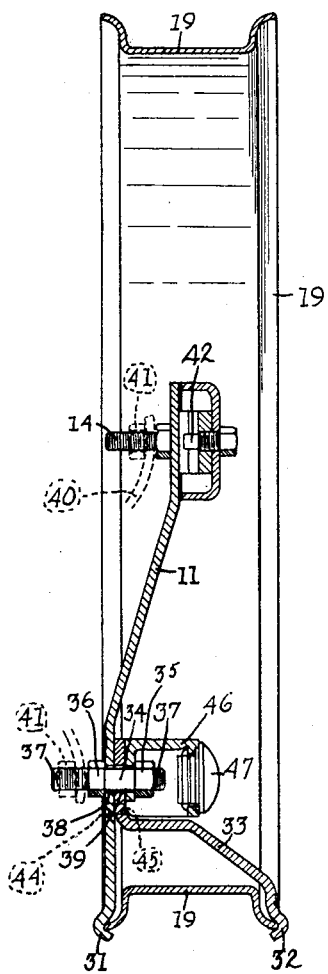
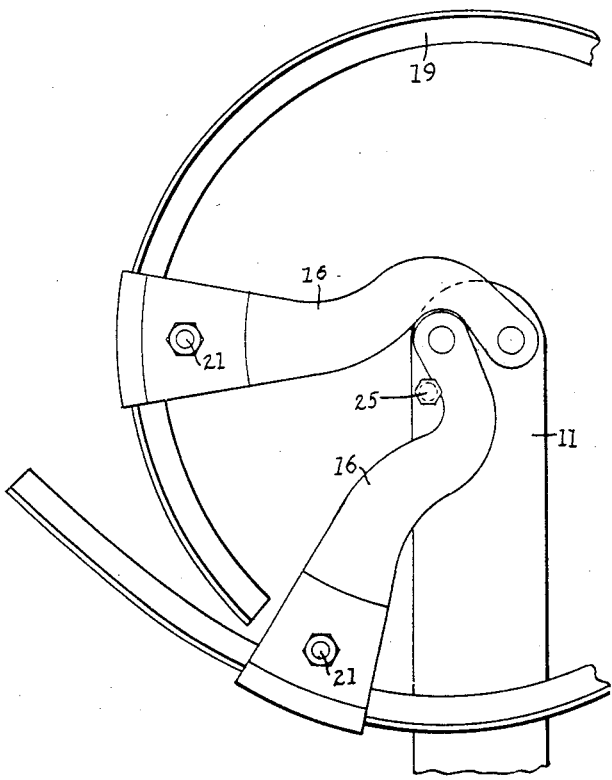
Jay S. Culp
Inventor
by Smith and Freeman
Attorneys Patented Dec. 13, 1927.

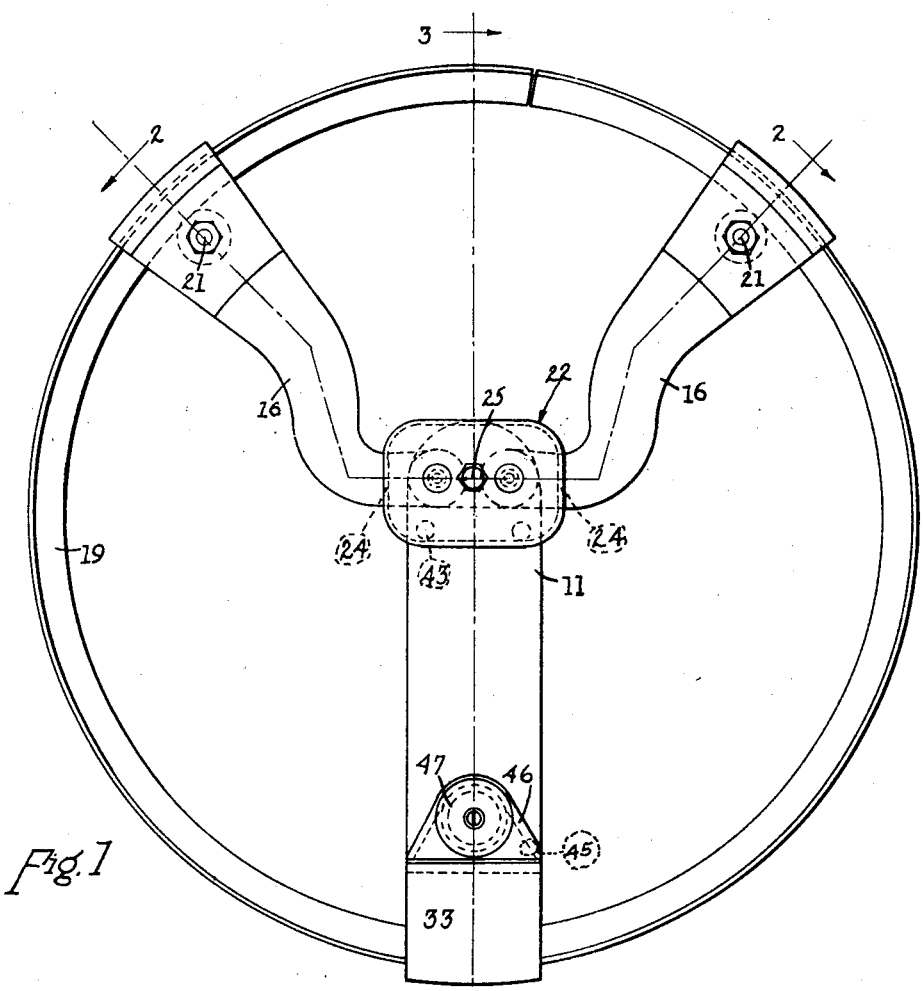
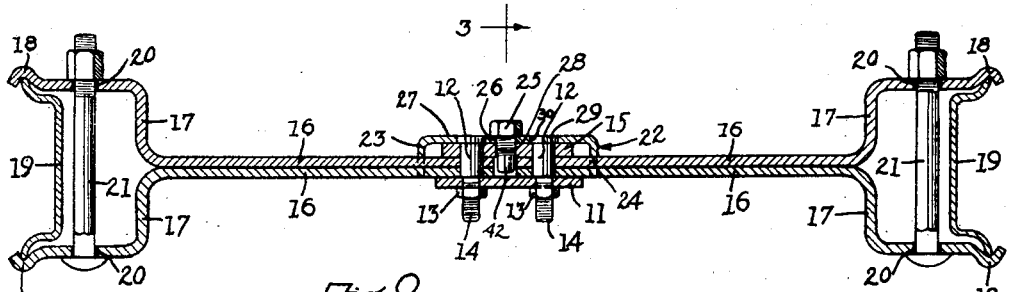

1,652,560

UNITED STATES PATENT OFFICE.

JAY S. CULP, OF CLEVELAND, OHIO.

TIRE CARRIER.

Application filed August 15, 1925. Serial No. 50,398.

Difficulty in collapsing straight side rims of the usual type has led to the production of a number of special tools designed particularly for that purpose. So far as I am aware, however, none of these tools are both convenient to carry in an automobile and also non-injurious to the rim. In addition, even such injurious tools are seldom carried in automobiles both because of the cost, and also because of the lack of space in the automobile or the lack of foresight on the part of the owner of the automobile. My invention is designed to overcome all of these defects by providing a carrier for the spare tire of the automobile adapted to also serve as a tool for collapsing the rim. My invention may be carried out in any one of a large number of embodiments but I have shown herein, for purposes of illustration, that embodiment which I now believe to be the most satisfactory commercially.

In these drawings accompanying this specification, forming a part thereof, and showing this illustrative embodiment of my invention:

Figure 1 is a plan view showing the device in its normal rim supporting position, Figure 2 is a section on the line 2—2 of Figure 1, Figure 3 is a section on the line 3—3 of Figure 1, while Figure 4 is a view similar to Figure 1 showing the carrier in its rim collapsed position.

This application is a continuation in part of my copending application 757,387 filed December 22, 1924.

The embodiment of my invention herein shown comprises a base plate 11 provided at its upper end with two pivot pins 12 secured to the base plate 11 by nuts 13 engaging the threaded shanks 14 of the pivot pins 12, connected at their free ends by means of a link 15, and each carrying between the base plate 11 and the link 15 a pair of arms 16 provided at their free ends with off-set portions 17 terminating in jaws 18 effective to firmly and non-pivotally grip a tire rim 19, and provided also with apertures 20 for the passage of a bolt 21 effective to hold the jaws 18 in gripping position upon the tire rim 19.

Rotation of the arms 16 about the pivot pins 12 is normally prevented by a cover member 22 which is provided with a rim 23 having two cutouts 24 each closely engaging one pair of arms 16 to prevent rotation of the arms 16 without corresponding movement of the cover member 22, is held in position by means of a machine screw 25 passing through an aperture 26 in the top portion 27 of the cover member 22 into a threaded recess 28 in the link 15, and is held against oscillation by the presence of the heads 29 of the pivot pins 12 within closely fitting apertures 30 in the top portion 27 of the cover member 22.

A third support for the tire rim 19 is provided by a pair of jaws adjacent the lower end of the base plate 11 consisting of one jaw 31 formed directly on the lower end of the base plate 11 and a cooperating jaw 32 formed on a clamping plate 33 arranged to be secured to the base plate 11 by means of a clamping bolt 34 comprising nuts 35 and 36 cooperatively engaging a threaded shank 37 passing through cooperating apertures 38 and 39 in the base plate 11 and the clamping plate 33 respectively.

It will be understood by those skilled in the art that the entire device will be supported from the automobile in any suitable manner, for example by means of a bracket 40 provided with apertures arranged to receive the threaded shanks 14 of the pivot pins 12 and the threaded shank 37 of the clamping bolt 34, secured to the automobile in any desired manner, and secured to the tire carrier by nuts 41 cooperating with the threaded shanks 14 and 37 of the pivot pins 12 and clamping bolt 34 respectively to secure the adjacent portions of the bracket 40 fixedly to the pivot pins 12 and clamping bolt 34, and thus to the tire carrier as a whole.

From the above description it will be understood that the tire carrier is mounted on the automobile in the same general manner as tire carriers now in use and that with the arms 16 secured against rotation the tire carrier supports the spare tire in very much the usual manner and permits removal of the spare tire by loosening of the bolts 21 and nut 35.

On the other hand, by loosening the nut 35 and by removing the cover member 22 the arms 16 may be swung on their pivot pins 12 into the position shown in Figure 4, or the corresponding position assumed by rotation in the reverse direction, in either of which the rim has been thoroughly collapsed to permit ready removal of the tire casing from the rim or application of the tire casing to the rim, the arms 16 and rim 19 being swung to the left or the right usually according to the positioning of the means carried by the rim for locking the rim in expanded or operating position.

The arms 16 and rim 19 may conveniently be held in this position by inserting the reduced tip 42 of the machine screw 25 into the corresponding recess 43 in the base plate 11 whereupon the machine screw 25 acts as an abutment to prevent return movement of the arms 16 and rim 19.

In order to prevent unauthorized removal of the spare tire from the device I may lock the carrier in any one of several ways, particularly by locking the clamping plate 33 to the base plate 11, either by means of a padlock (not shown) extending through cooperating apertures 44 and 45 in the base plate 11 and clamping plate 33, or by means of a housing 46 secured in position on the clamping bolt 34 and having its open end closed by means of a removable lock 47 which until removal prevents access to the nut 35 of the clamping bolt 34 and thus completely prevents even the slightest loosening of the clamping plate 33.

From the above description it will be apparent that the embodiment of my invention herein shown and described not only provides a thoroughly suitable device for carrying a spare tire on an automobile but also provides means for collapsing the rim for application or removal of a tire casing therefrom, and it will therefore be apparent that the embodiment of my invention herein shown and described accomplishes the principal purposes of my invention. On the other hand, those skilled in the art will find in this embodiment of my invention advantages other than those specifically set forth or suggested herein and in addition will readily realize that this particular embodiment of my invention may be variously changed and modified without departing from the spirit of my invention or sacrificing the advantages thereof. It will therefore be understood that this disclosure is illustrative only and that my invention is not limited thereto.

I claim:

1. A tire carrier for carrying and collapsing a spare tire rim, comprising two arms each formed to engage the rim, and means supporting said arms from an automobile for movement having the herein essential action of simultaneous rotation about unalined axes rotating said rim bodily and effective to collapse said rim.

2. A tire carrier for carrying and collapsing a spare tire rim, comprising two arms each formed to engage the rim, and means supporting said arms from an automobile for movement substantially in the plane of said rim having the herein essential action of simultaneous rotation about unalined axes rotating said rim bodily and effective to collapse said rim.

3. A tire carrier for carrying and collapsing a spare tire rim, comprising two arms each formed to engage the rim, and means supporting said arms from an automobile for simultaneous rotation about unalined axes rotating said rim bodily and effective to collapse said rim.

4. A tire carrier for carrying and collapsing a spare tire rim, comprising two arms each formed to fixedly grip the rim, and means supporting said arms from an automobile for movement having the herein essential action of simultaneous rotation about unalined axes rotating said rim bodily and effective to collapse said rim.

5. A tire carrier for carrying and collapsing a spare tire rim, comprising two arms each formed to fixedly grip the rim, and means supporting said arms from an automobile for movement substantially in the plane of said rim having the herein essential action of simultaneous rotation about unalined axes rotating said rim bodily and effective to collapse said rim.

6. A tire carrier for carrying and collapsing a spare tire rim, comprising two arms each formed to engage the rim, a base arranged to be fixedly supported from an automobile, and to itself support said arms for simultaneous rotation of said arms and rim relative to said base to collapse said rim, and means also carried by said base stationary relative to said base and said automobile and arranged to engage said rim to additionally support said rim.

7. A tire carrier for carrying and collapsing a spare tire rim, comprising two arms each formed to engage the rim, a base arranged to be fixedly supported from an automobile, and to itself support said arms for simultaneous rotation of said arms and rim relative to said base substantially in the plane of said rim to collapse said rim, and means also carried by said base stationary relative to said base and said automobile and arranged to engage said rim to additionally support said rim.

8. A tire carrier for carrying and collapsing a spare tire rim, comprising two arms each formed to engage the rim, a base arranged to be fixedly supported from an automobile, and to itself support said arms for simultaneous rotation of said arms and rim relative to said base to collapse said rim, means also carried by said base stationary relative to said base and said automobile and arranged to engage said rim to additionally support said rim and in such supporting position prevent removal or such rotation of said rim, and means to lock said last means in such supporting and preventing position.

9. A tire carrier for carrying and collapsing a spare tire rim, comprising two arms each formed to fixedly and non-pivotally grip the rim, and means supporting said arms from an automobile for movement having the herein essential action of simultaneous rotation about unalined axes rotating said rim bodily and effective to collapse said rim.

10. A tire carrier for carrying and collapsing a spare tire rim, comprising two arms each formed to fixedly and non-pivotally grip the rim, and means supporting said arms from an automobile for movement substantially in the plane of said rim and having the herein essential action of simultaneous rotation about unalined axes rotating said rim bodily and effective to collapse said rim.

11. A tire carrier for carrying and collapsing a spare tire rim, comprising two arms each formed to fixedly and non-pivotally grip the rim, and means supporting said arms from an automobile for simultaneous rotation about unalined axes rotating said rim bodily and effective to collapse said rim.

12. A tire carrier for carrying and collapsing a spare tire rim, comprising two arms each formed to engage said rim, a base arranged to be fixedly supported from an automobile and to itself support said arms and rim for movement relative to said base by movement of said arms having the herein essential action of simultaneous rotation about unalined axes rotating said rim bodily and effective to collapse said rim, and means also carried by said base stationary relative to said base and said automobile and arranged to engage said rim to additionally support said rim.

13. A tire carrier for carrying and collapsing a spare tire rim, comprising two arms each formed to engage said rim, a base arranged to be fixedly supported from an automobile and to itself support said arms and rim relative to said base for movement of said arms having the herein essential action of simultaneous rotation about unalined axes rotating said rim bodily and effective to collapse said rim, means also carried by said base stationary relative to said base and said automobile and arranged to engage said rim to additionally support said rim and in such supporting position prevent removal and such rotation of said rim, and lock means for locking said last means in such preventing and supporting position.

14. A tire carrier for carrying and collapsing a spare tire rim, comprising two arms each formed to fixedly and non-rotatably grip the rim, a base arranged to be fixedly supported from an automobile, and to itself support said arms for simultaneous rotation of said arms and rim relative to said base to collapse said rim, and means also carried by said base stationary relative to said base and said automobile and arranged to engage said rim to additionally support said rim and in such supporting position prevent such rotation of said rim.

15. A tire carrier for carrying and collapsing a spare tire rim, comprising two arms each formed to fixedly and non-rotatably grip the rim, a base arranged to be fixedly supported from an automobile, and to itself support said arms for simultaneous rotation of said arms and rim relative to said base substantially in the plane of said rim to collapse said rim, and means also carried by said base stationary relative to said base and said automobile and arranged to engage said rim to additionally support said rim and in such supporting position prevent such rotation of said rim.

16. A tire carrier for carrying and collapsing a spare tire rim, comprising two arms each formed to fixedly and non-rotatably grip the rim, a base arranged to be fixedly supported from an automobile, and to itself support said arms for simultaneous rotation of said arms and rim relative to said base to collapse said rim, means also carried by said base stationary relative to said base and said automobile and arranged to engage said rim to additionally support said rim and in such supporting position prevent removal or such rotation of said rim, and means to lock said last means in such supporting and preventing position.

17. A tire carrier for carrying and collapsing a spare tire rim, comprising two arms each formed to fixedly grip said rim, a base arranged to be fixedly and non-rotatably supported from an automobile and to itself support said arms and rim for movement relative to said base by movement of said arms having the herein essential action of simultaneous rotation about unalined axes rotating said rim bodily and effective to collapse said rim, and means also carried by said base stationary relative to said base and said automobile and arranged to engage said rim to additionally support said rim and in such supporting position prevent such rotation of said rim.

18. A tire carrier for carrying and collapsing a spare tire rim, comprising two arms each formed to fixed and non-pivotally grip said rim, a base arranged to be fixedly supported from an automobile and to itself support said arms and rim for movement relative to said base by movement of said arms substantially in the plane of said rim and having the herein essential action of simultaneous rotation about unalined axes rotating said rim bodily and effective to collapse said rim, and means also carried by said base and stationary relative to said base automobile and arranged to engage said rim to additionally support said rim and in such supporting position prevent such rotation of said rim.

19. A tire carrier for carrying and collapsing a spare tire rim, comprising two arms each formed to fixedly grip said rim, a base arranged to be fixedly and non-pivotally supported from an automobile and to itself support said arms and rim for movement relative to said base by simultaneous rotation of said arms about unalined axes rotating said rim bodily and effective to collapse said rim, and means also carried by said base stationary relative to said base and said automobile and arranged to engage said rim to additionally support said rim and in such supporting position prevent such rotation of said rim.

20. A tire carrier for carrying and collapsing a spare tire rim, comprising two arms each formed to fixedly and non-pivotally grip said rim, a base arranged to be fixedly supported from an automobile and to itself support said arms and rim for movement relative to said base by movement of said arms having the herein essential action of simultaneous rotation about unalined axes rotating said rim bodily and effective to collapse said rim, and means also carried by said base stationary relative to said base and said automobile and arranged to engage said rim to additionally support said rim and in such supporting position prevent removal and such rotation of said rim, and lock means for locking said last means in such preventing and supporting position.

21. A tire carrier comprising a base arranged to be secured in position upon an automobile, two arms each arranged to engage the spare tire rim and to at least partially support said rim in carried position upon the automobile, and means supporting said arms from said base in such manner that actuation may be imparted to said arms simultaneously, with the movement of one arm different from that of the other arm and with said movements together effective to cause said arms to collapse said rim to permit application of a tire to said rim or removal of a tire from said rim, the movement of said arms being eccentric to the circle normally defined by said rim but in the same direction in the direction of extent of the circumference of said rim.

22. A tire carrier comprising a base arranged to be secured in position upon an automobile, two arms each arranged to fixedly grip the spare tire rim and to at least partially support said rim in carried position upon the automobile, and means supporting said arms from said base in such manner that actuation may be imparted to said arms simultaneously, with the movement of one arm different from that of the other arm and with said movements together effective to cause said arms to collapse said rim to permit application of a tire to said rim or removal of a tire from said rim, the movement of said arms being eccentric to the circle normally defined by said rim but in the same direction in the direction of extent of the circumference of said rim.

23. A tire carrier comprising a base arranged to be secured in position upon an automobile, two arms each arranged to fixedly and non-pivotally grip the spare tire rim and to at least partially support said rim in carried position upon the automobile, and means supporting said arms from said base in such manner that actuation may be imparted to said arms simultaneously, with the movement of one arm different from that of the other arm and with said movements together effective to cause said arms to collapse said rim to permit application of a tire to said rim or removal of a tire from said rim, the movement of said arms being eccentric to the circle normally defined by said rim but in the same direction in the direction of extent of the circumference of said rim.

24. A tire carrier comprising a base arranged to be secured in position upon an automobile, two arms each arranged to engage the spare tire rim and to at least partially support said rim in carried position upon the automobile, and means supporting said arms from said base in such manner that actuation may be imparted to said arms simultaneously, with the movement of one arm different from that of the other arm and with said movements together effective to cause said arms to collapse said rim to permit application of a tire to said rim or removal of a tire from said rim, the movement of said arms being eccentric to the circle normally defined by said rim and in opposite directions in the direction of extent of the radii of the circle normally defined by said rim.

25. A tire carrier comprising a base arranged to be secured in position upon an automobile, two arms each arranged to fixedly grip the spare tire rim and to at least partially support said rim in carried position upon the automobile, and means supporting said arms from said base in such manner that actuation may be imparted to said arms simultaneously, with the movement of one arm different from that of the other arm and with said movements together effective to cause said arms to collapse said rim to permit application of a tire to said rim or removal of a tire from said rim, the movement of said arms being eccentric to the circle normally defined by said rim and in opposite directions in the direction of extent of the radii of the circle normally defined by said rim.

26. A tire carrier comprising a base arranged to be secured in position upon an automobile, two arms each arranged to fixedly and non-pivotally grip the spare tire rim and to at least partially support said rim in carried position upon the automobile, and means supporting said arms from said base in such manner that actuation may be imparted to said arms simultaneously, with the movement of one arm different from that of the other arm and with said movements together effective to cause said arms to collapse said rim to permit application of a tire to said rim or removal of a tire from said rim, the movement of said arms being eccentric to the circle normally defined by said rim and in opposite directions in the direction of extent of the radii of the circle normally defined by said rim.

27. A tire carrier comprising a base arranged to be secured in position upon an automobile, two arms each arranged to engage the spare tire rim and to at least partially support said rim in carried position upon the automobile, and means supporting said arms from said base in such manner that actuation may be imparted to said arms simultaneously, with the movement of one arm different from that of the other arm and with said movements together effective to cause said arms to collapse said rim to permit application of a tire to said rim or removal of a tire from said rim, the movement of said arms being eccentric to the circle normally defined by said rim and in opposite directions in the direction of extent of the radii of the circle normally defined by said rim but in the same direction in the direction of extent of the circumference of said rim.

28. A tire carrier comprising a base arranged to be secured in position upon an automobile, two arms each arranged to fixedly grip the spare tire rim and to at least partially support said rim in carried position upon the automobile, and means supporting said arms from said base in such manner that actuation may be imparted to said arms simultaneously, with the movement of one arm different from that of the other arm and with said movements together effective to cause said arms to collapse said rim to permit application of a tire to said rim or removal of a tire from said rim, the movement of said arms being eccentric to the circle normally defined by said rim and in opposite directions in the direction of extent of the radii of the circle normally defined by said rim but in the same direction in the direction of extent of the circumference of said rim.

29. A tire carrier comprising a base arranged to be secured in position upon an automobile, two arms each arranged to fixedly and non-pivotally grip the spare tire rim and to at least partially support said rim in carried position upon the automobile, and means supporting said arms from said base in such manner that actuation may be imparted to said arms simultaneously, with the movement of one arm different from that of the other arm and with said movement together effective to cause said arms to collapse said rim to permit application of a tire to said rim or removal of a tire from said rim, the movement of said arms being eccentric to the circle normally defined by said rim and in opposite directions in the direction of extent of the radii of the circle normally defined by said rim but in the same direction in the direction of extent of the circumference of said rim.

30. Mechanism for supporting and collapsing a tire rim, comprising two arms each formed to engage the rim, and means supporting said arms from a relatively fixed base for movement having the herein essential action of simultaneous rotation about unalined axes rotating said rim bodily and effective to collapse said rim.

31. Mechanism for supporting and collapsing a tire rim, comprising two arms each formed to engage the rim, and means supporting said arms from a relatively fixed base for movement substantially in the plane of said rim having the herein essential action of simultaneous rotation about unalined axes rotating said rim bodily and effective to collapse said rim.

32. Mechanism for supporting and collapsing a tire rim, comprising two arms each formed to engage the rim, and means supporting said arms from a relatively fixed base for simultaneous rotation about unalined axes rotating said rim bodily and effective to collapse said rim.

33. Mechanism for supporting and collapsing a tire rim, comprising two arms each formed to fixedly grip the rim, and means supporting said arms from a relatively fixed base for movement having the herein essential action of simultaneous rotation about unalined axes rotating said rim bodily and effective to collapse said rim.

34. Mechanism for supporting and collapsing a tire rim, comprising two arms each formed to fixedly grip the rim, and means supporting said arms from a relatively fixed base for movement substantially in the plane of said rim having the herein essential action of simultaneous rotation about unalined axes rotating said rim bodily and effective to collapse said rim.

35. Mechanism for supporting and collapsing a tire rim, comprising two arms each formed to fixedly and non-pivotally grip the rim, and means supporting said arms from a relatively fixed base for movement having the herein essential action of simultaneous rotation about unalined axes rotating said rim bodily and effective to collapse said rim.

36. Mechanism for supporting and collapsing a tire rim, comprising two arms each formed to fixedly and non-pivotally grip the rim, and means supporting said arms from a relatively fixed base for movement substantially in the plane of said rim and having the herein essential action of simultaneous rotation about unalined axes rotating said rim bodily and effective to collapse said rim.

37. Mechanism for supporting and collapsing a tire rim, comprising two arms each formed to fixedly and non-pivotally grip the rim, and means supporting said arms from a relatively fixed base for simultaneous rotation about unalined axes rotating said rim bodily and effective to collapse said rim.

38. Mechanism comprising a base arranged to be secured in position upon a relatively fixed support, two arms each arranged to engage a tire rim and to at least partially support said rim from said support, and means supporting said arms from said base in such manner that actuation may be imparted to said arms simultaneously, with the movement of one arm different from that of the other arm and with said movements together effective to cause said arms to collapse said rim to permit application of a tire to said rim or removal of a tire from said rim, the movement of said arms being eccentric to the circle normally defined by said rim but in the same direction in the direction of extent of the circumference of said rim.

39. Mechanism comprising a base arranged to be secured in position upon a relatively fixed support, two arms each arranged to fixedly and non-pivotally grip a tire rim and to at least partially support said rim from said support, and means supporting said arms from said base in such manner that actuation may be imparted to said arms simultaneously, with the movement of one arm different from that of the other arm and with said movements together effective to cause said arms to collapse said rim to permit application of a tire to said rim or removal of a tire from said rim, the movement of said arms being eccentric to the circle normally defined by said rim but in the same direction in the direction of extent of the circumference of said rim.

40. Mechanism comprising a base arranged to be secured in position upon a relatively fixed support, two arms each arranged to engage a tire rim and to at least partially support said rim from said support, and means supporting said arms from said base in such manner that actuation may be imparted to said arms simultaneously, with the movement of one arm different from that of the other arm and with said movements together effective to cause said arms to collapse said rim to permit application of a tire to said rim or removal of a tire from a said rim, the movement of said arms being eccentric to the circle normally defined by said rim and in opposite directions in the direction of extent of the radii of the circle normally defined by said rim.

41. Mechanism comprising a base arranged to be secured in position upon a relatively fixed support, two arms each arranged to fixedly and non-pivotally grip a tire rim and to at least partially support said rim from said support, and means supporting said arms from said base in such manner that actuation may be imparted to said arms simultaneously, with the movement of one arm different from that of the other arm and with said movements together effective to cause said arms to collapse said rim to permit application of a tire to said rim or removal of a tire from said rim, the movement of said arms being eccentric to the circle normally defined by said rim and in opposite directions in the direction of extent of the radii of the circle normally defined by said rim.

42. Mechanism comprising a base arranged to be secured in position upon a relatively fixed support, two arms each arranged to engage a tire rim and to at least partially support said rim from said support, and means supporting said arms from said base in such manner that actuation may be imparted to said arms simultaneously, with the movement of one arm different from that of the other arm and with said movements together effective to cause said arms to collapse said rim to permit application of a tire to said rim or removal of a tire from said rim, the movement of said arms being eccentric to the circle normally defined by said rim and in opposite directions in the direction of extent of the radii of the circle normally defined by said rim but in the same direction in the direction of extent of the circumference of said rim.

43. Mechanism comprising a base arranged to be secured in position upon a relatively fixed support, two arms each arranged to fixedly and non-pivotally grip a tire rim and to at least partially support said rim from said support, and means supporting said arms from said base in such manner that actuation may be imparted to said arms simultaneously, with the movement of one arm different from that of the other arm and with said movements together effective to cause said arms to collapse said rim to permit application of a tire to said rim or removal of a tire from said rim, the movement of said arms being eccentric to the circle normally defined by said rim and in opposite directions in the direction of extent of the radii of the circle normally defined by said rim but in the same direction in the direction of extent of the circumference of said rim.

In testimony whereof I hereunto affix my signature.

JAY S. CULP.